(12) United States Patent
Khurana et al.

(10) Patent No.: US 11,727,502 B1
(45) Date of Patent: *Aug. 15, 2023

(54) COMPUTERIZED GEOLOCATION TOOL

(71) Applicant: Wells Fargo Bank, N.A., San Francisco, CA (US)

(72) Inventors: Kanwaljit Khurana, Huntersville, NC (US); Amy L. Jucoski, Lexington, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/844,270

(22) Filed: Jun. 20, 2022

Related U.S. Application Data

(63) Continuation of application No. 16/948,754, filed on Sep. 30, 2020, now Pat. No. 11,367,147, which is a
(Continued)

(51) Int. Cl.
*G06Q 40/12* (2023.01)
*G06Q 50/00* (2012.01)
*G06F 3/0481* (2022.01)

(52) U.S. Cl.
CPC ............. *G06Q 40/12* (2013.12); *G06Q 50/01* (2013.01); *G06F 3/0481* (2013.01)

(58) Field of Classification Search
None
See application file for complete search history.

(56) References Cited

U.S. PATENT DOCUMENTS

| 7,219,078 B2 | 5/2007 | Lamont |
| 8,909,771 B2 | 12/2014 | Heath |

(Continued)

FOREIGN PATENT DOCUMENTS

| WO | WO-0191018 A1 | 11/2001 |

OTHER PUBLICATIONS

"Affordability calculator", Zillow, [Online]. Retrieved from the Internet: <URL: https://www.zillow.com/mortgage-calculator/house-affordability/, (Accessed Feb. 22, 2016), 7 pgs.
(Continued)

*Primary Examiner* — Scott A Zare
(74) *Attorney, Agent, or Firm* — Schwegman Lundberg & Woessner, P.A.

(57) ABSTRACT

Various examples are directed to systems and methods for providing location-specific financial information to a user. A geographic data system may receive a social media data feed and an e-mail feed. The geographic data system may extract theme data from at least one of the social media feed data or the e-mail data and select a first user expense category based at least in part on the theme data. The geographic data system may receive from an application executing at a user computing device location data indicating a first geographic location and generate a location-specific user expense based at least in part on the first user expense category and the location data. The geographic data system may generate a graphical user interface comprising a map including the first geographic location and an indication of the location-specific user expense.

18 Claims, 10 Drawing Sheets

Related U.S. Application Data continuation of application No. 15/629,429, filed on Jun. 21, 2017, now Pat. No. 10,796,378.

(60) Provisional application No. 62/354,721, filed on Jun. 25, 2016.

(56) References Cited

U.S. PATENT DOCUMENTS

| | | | |
|---|---|---|---|
| 10,091,324 | B2 | 10/2018 | Buhr |
| 10,178,507 | B1 | 1/2019 | Roberts |
| 10,796,378 | B1 | 10/2020 | Khurana et al. |
| 2008/0015890 | A1 | 1/2008 | Malyala |
| 2008/0046382 | A1* | 2/2008 | Metz .................... G06Q 40/00 705/36 R |
| 2010/0299245 | A1 | 11/2010 | Kaufman |
| 2011/0136500 | A1 | 6/2011 | SUng et al. |
| 2012/0185486 | A1 | 7/2012 | Voigt et al. |
| 2012/0239583 | A1 | 9/2012 | Dobrowolski |
| 2013/0054699 | A1 | 2/2013 | Macaskill |
| 2013/0346117 | A1 | 12/2013 | Fields et al. |
| 2014/0136294 | A1 | 5/2014 | Martinovic et al. |
| 2014/0214479 | A1 | 7/2014 | Singel et al. |
| 2016/0026942 | A1* | 1/2016 | Simon .................... G16H 50/80 705/2 |
| 2016/0078561 | A1 | 3/2016 | Farrell et al. |
| 2016/0350867 | A1 | 12/2016 | Votaw et al. |
| 2017/0236215 | A1 | 8/2017 | Eisen et al. |
| 2017/0337635 | A1 | 11/2017 | Kneuse |

OTHER PUBLICATIONS

"U.S. Appl. No. 15/629,429, Non Final Office Action dated Jan. 10, 2020".

"U.S. Appl. No. 15/629,429, Notice of Allowance dated Jun. 4, 2020".

"U.S. Appl. No. 15/629,429, Response filed Apr. 10, 2020 to Non Final Office Action dated Jan. 10, 2020".

"U.S. Appl. No. 16/948,754, 312 Amendment filed Mar. 24, 2022".

"U.S. Appl. No. 16/948,754, Non Final Office Action dated Oct. 6, 2021".

"U.S. Appl. No. 16/948,754, Notice of Allowance dated Feb. 14, 2022".

"U.S. Appl. No. 16/948,754, PTO Response to Rule 312 Communication dated Apr. 5, 2022".

"U.S. Appl. No. 16/948,754, Response filed Dec. 8, 2021 to Non Final Office Action dated Oct. 6, 2021", 8 pgs.

"Cost of Living Index", The Council for communication and economic research, [Online]. Retrieved from the Internet: URL: http://web.archive.org/web/20150625081845/http://c2c.coli.org/compare.asp?action=sample>, (Jun. 25, 2015), 3 pgs.

"Helpful Resources on Affording a Home", Discover, [Online], Retrieved from the Internet: <URL: https://www.discover.com/home-loans/affordability-calculator/, (Accessed Feb. 22, 2016), 1 pgs.

"House Affordability Calculator to Calculate a Realistic Home Price", [Online], Retrieved from the Internet: <URL: http://www.free-oniine-calculator-use.com/house-affordability-calculator.html, (Accessed Feb. 22, 2016), 5 pgs.

Florida, Richard, "Cost of Living is Really All About Housing", CityLab, [Online]. Retrieved from the Internet: <URL: www.citylab.com>, (Jul. 21, 2014), 7 pgs.

U.S. Appl. No. 15/629,429 U.S. Pat. No. 10,796,378, filed June 21, 2017, Computerized Geolocation Tool.

U.S. Appl. No. 16/948,754 U.S. Pat. No. 11,367,147, filed Sep. 30, 2020, Computerized Geolocation Tool.

* cited by examiner

COMPUTERIZED GEOLOCATION TOOL

PRIORITY

This application is a continuation of U.S. patent application Ser. No. 16/948,754, filed Sep. 30, 2020, which application is a continuation of U.S. patent application Ser. No. 15/629,429, filed Jun. 21, 2017, now issued as U.S. Pat. No. 10,796,378, which claims the benefit of U.S. Provisional Application Ser. No. 62/354,721 filed on Jun. 25, 2016, each of which are incorporated herein by reference in their entirety.

TECHNICAL FIELD

Embodiments described herein generally relate to systems and methods for configuring a computing device to provide up-to-date location-specific financial information.

BACKGROUND

Financial decisions, such as a decision to purchase a house, a car, or other major asset, can have significant ramifications, not all of which are readily apparent.

DRAWINGS

In the drawings, which are not necessarily drawn to scale, like numerals may describe similar components in different views. Like numerals having different letter suffixes may represent different instances of similar components. Some embodiments are illustrated by way of example, and not of limitation, in the figures of the accompanying drawings, in which.

DETAILED DESCRIPTION

Figure 1:
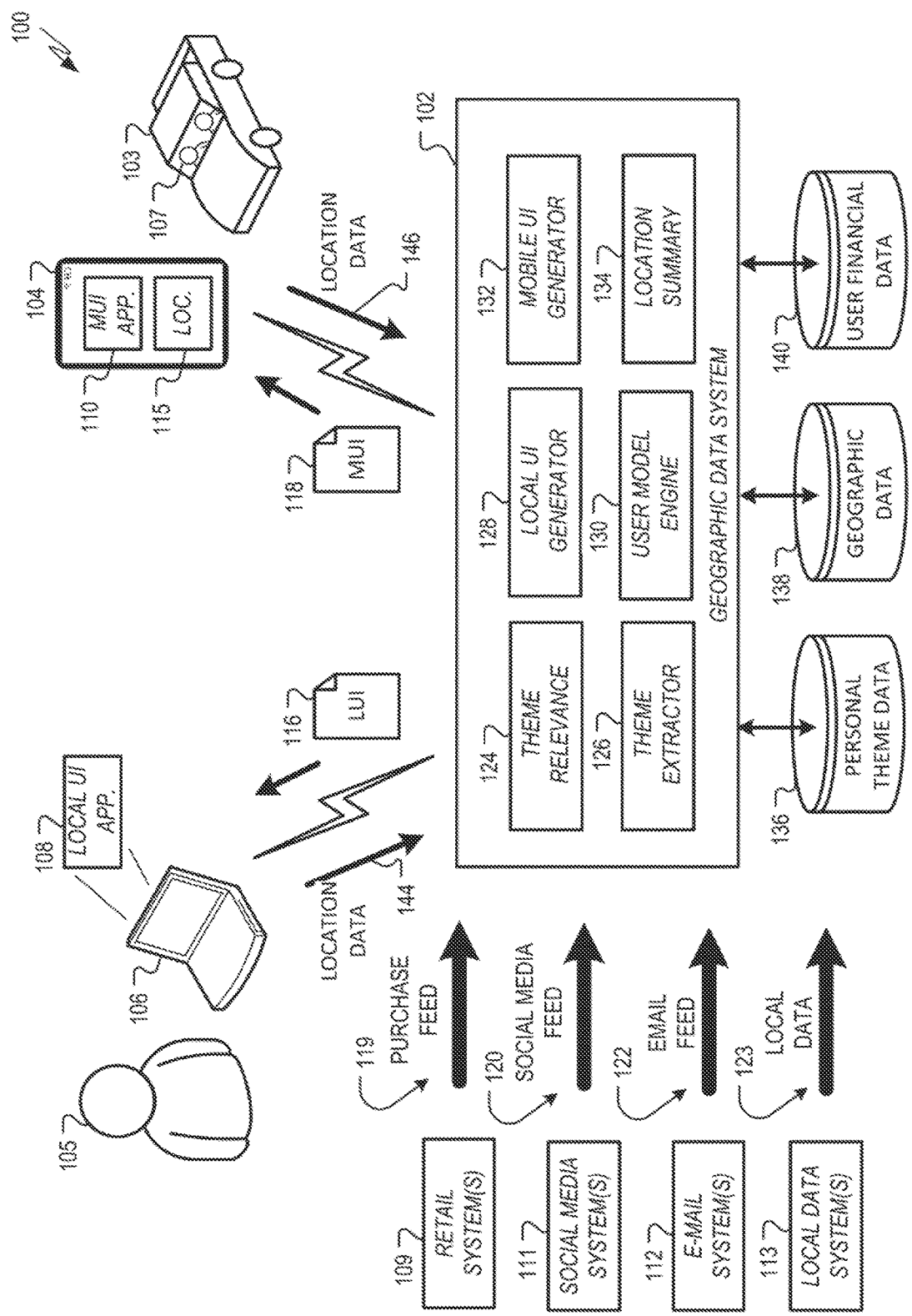
FIG. 1 is a diagram showing one example of an environment for providing location-specific financial data.

Various examples described herein are directed to systems and methods for configuring a computer system to provide location-specific financial information such as, for example, financial information related to a major asset purchase. Making a decision to purchase a major asset, such as a house, a car, etc., can have a significant impact on purchaser. A potential house buyer is often aware of the major implications of purchasing a house, such as the price of the house, the particulars of obtaining a mortgage, the school district where the house is located, etc. A decision to purchase a house, however, can have significant location-related effects that are not always completely clear at the time of purchase. For example, if the potential house buyer has elderly parents, the proximity and quality of nearby senior care facilities may cause or save significant financial or non-financial costs. In another example, if the potential house buyer or an immediate family member has back problems, the proximity and quality of nearby chiropractors may also cause or save significant financial or non-financial costs. In yet another example, if the potential house buyer or an immediate family member has allergies, the expected pollen counts at the location of the house can significantly affect the potential house buyer's enjoyment of the house. Information relevant to major asset purchases exists, but is often scattered. Even a human user making an asset purchase is unlikely to think of or consider factors that could well have a significant impact on their cost or enjoyment. Further, determining the impact of location-specific factors often requires extensive research that simply is not practical.

A computerized geolocation tool, as described herein, includes one or more computing devices and optional sensing devices to discover and display to a user location-specific effects of a potential purchase of a house or other major asset. The computerized geolocation tool may comprise a geographic data system including one or more servers or other computing devices. The geographic data system may receive data from one or more other computing devices and/or sensors and derive, for a user, effects of a major asset purchase, such as the purchase of a house. The geographic data system leverages user data describing the user and location data describing a location to determine location-specific financial and/or non-financial effects of the asset purchase. For example, the geographic data system may utilize user data, such as the location of a house or other major asset that the user may potentially purchase to determine location-specific user expenses. The geographic data system may generate a graphical user interface describing the financial and/or non-financial effects of the asset purchase and serve the user interface to the user.

User data utilized by the geographic data system may be of any suitable form including, for example, personal data and financial data. Personal data can include, for example, social media posts or tweets made by the user, e-mails sent or received by the user, a web browsing history of the user, etc. The geographic data system may extract user themes from the personal data. Themes may describe common topics that are referred to repeatedly in a social media feed, e-mail feed, etc. For example, if a user sends e-mails to siblings regarding an elderly parent, the geographic data system may determine that the proximity and quality of senior care facilities to a potential home is relevant to the user. Also, for example, if the user is a frequent contributor to a social media page for a pick-up basketball league, the geographic data system may determine that the proximity and quality of gyms is relevant to the user.

Financial data may describe assets of the user, such as securities held by the user, savings of the user, houses owned by the user, etc. In some examples, financial data also includes goal data describing a financial goal of the customer. A financial goal may be a purchase and/or financial state the user would like to achieve. For example, a user may wish to purchase a second home within ten years. Also, for example, the user may wish to retire in twenty years and have a certain amount of income from savings at that time.

The geographic data system may be configured to analyze the personal data and extract user themes (e.g., the user is responsible for the care of an elderly relative, the user has pollen-related allergies, etc.) For example, the geographic data system may search one or more social media feeds and/or e-mail feeds relating to the user. The geographic data system may apply keyword searches to the respective feeds. If a feed includes more than a keyword threshold number and/or density of keywords related to a particular theme (e.g., pollen-related allergies, elderly parents, etc.), the geographic data system may return an indication that the particular theme is relevant for the user.

The user may provide location data describing a location for analysis by the geographic data system. The geographic data system receives the location data from a user computing device of the user or another source. In some examples, the user computing device comprises a Global Positioning System (GPS) or other suitable location-sensing subsystem that senses a location of the user computing device and provides the location of the user computing device with the location data. In this way, the geographic data system may customize the effects of the potential asset purchase to the user's current location. For example, the user may take a mobile phone or other mobile user computing device along while inspecting houses or other assets for purchase. The geographic data system may provide location-specific financial data, updated as the location of the user computing device (and the user) changes.

FIG. 1 is a diagram showing one example of an environment 100 for providing location-specific financial data. The environment comprises a geographic data system 102 in communication with one or more user computing devices 104, 106. The geographic data system 102 may also be in communication with one or more systems providing data feeds such as, for example, one or more social media systems 111, one or more e-mail systems 112, one or more local data systems 113, etc. The environment 100 shows two example users 105 and 107. User 105 utilizes a user computing device 106 that receives a local user interface 116 from the geographic data system 102. For example, location data 144 provided to the geographic data system 102 from the user computing device 106 may describe a location selected by the user 105. User 107 utilizes a user computing device 104 comprising a location subsystem 115. In this way, the user computing device 104 may provide the geographic data system 102 with location data 146 that represents the location of the user computing device 104, which is also likely to be the location of the user 107. For example, the user 107 is shown positioned in a vehicle 103 indicating that the user may move from place-to-place. Herein, except where otherwise indicated, the term "user" is used to refer to either type of user 105, 107.

The geographic data system 102 may send UIs 116, 118 to the user computing devices 104, 106 in any suitable manner. In some examples, UIs 116, 118 may include one or more UI files or other data units arranged according to Hypertext Transfer Protocol (HTTP) or any other suitable format. UI files may be sent to the user computing devices 104, 106, which may include a web browser for parsing the UI files and displaying them to the user 105, 107. In some examples, sending the UIs 116, 118 to the user computing devices may include sending data that the applications 108, 110 may utilize to update a UI file that previously existed at the user computing device 104, 106 (e.g., was previously sent by the geographic data system 102).

The geographic data system 102 may receive one or more data feeds 119, 120, 122, 123 describing a user and/or geographic locations from one or more custodial systems 109, 111, 112, 113. The data feeds 119, 120, 122, 123 may describe a single user or multiple users. Some or all of the data feeds 119, 120, 122, 123 may be purchased from a collector or custodian of the data. One or more retail custodial systems 109 may provide one or more purchase feeds 119. Purchase feeds may comprise data describing any suitable purchase made at a retail establishment including online establishments and bricks-and-mortar establishments. For example, purchase feeds 119 may include data gathered by a retail establishment incentive card program.

One or more social media systems 111 may provide one or more social media feeds 120. Social media feeds 120 may comprise data describing any suitable social media activity of a user or users. For example, a social media feed 120 may include data describing one or more social media postings that are made by a user, made to a user, reference a user, etc. Example social media postings that may be included in one or more social media feeds 120 include, posts on Facebook™, tweets on Twitter™, etc. Social media feeds 120 may include any suitable data describing social media activity including, for examples, copies of posts, summaries of posts, data describing the frequency and/or distribution of certain keywords in posts, etc.

One or more e-mail systems 112 may provide one or more e-mail feeds 122, which may include all or parts of e-mails sent or received by the user. In some examples, a single e-mail feed 122 may describe e-mails from a single user or multiple users. In some examples, each e-mail feed 122 may describe e-mails from a single e-mail account of a single user. For example, if a user has more than one e-mail account, the geographic data system 102 may receive a dedicated e-mail feed 122 for each e-mail account of the user. E-mail feeds 122 may include any suitable data describing e-mails including, for example, copies of e-mails, summaries of e-mails, data describing a frequency and/or distribution of certain keywords in the e-mails, etc.

One or more local data systems 113 may provide local data feeds 123. Local data feeds 123 may describe various geographic locations. For example, a local data system 113 may be configured to scan sources on the Internet to identify facts about various geographic locations and provide the facts via a local data feed 123. For example, the local data feed 123 may include an indication of businesses at or near a location, an indication of medical professions, such as chiropractors, at or near a location, an indication of housing costs at or near a location, in indication of zoning regulations at or near the location, an indication of news stories affecting the location, etc. In some examples, one or more local data systems 113 may regularly provide a local data feed providing data that may be stored, for example, at a geographic data store 138 as described herein.

The geographic data system 102 may comprise one or more subsystems for processing data, determining location-specific financial data, generating user interfaces for users, etc. A theme extractor subsystem 126 may receive the one or more e-mail feeds 122 and/or the one or more social media feeds and extract user-specific themes from one or more of the feeds 120, 122. Extracting themes from one or more of the feeds 120, 122 may include determining a topic of correspondence for one or more e-mails, social media posts, etc. Themes extracted from one or more of the feeds, as described herein, may form the basis of a location-specific expense or other location-specific financial data.

A theme relevance subsystem 124 may filter themes determined by the theme extractor subsystem 126 and select themes relevant to location-specific financial data to be provided to the client. For example, if a social media feed 120 and/or an e-mail feed 122 returns a result indicating that a user is a stamp collector, the theme relevance subsystem 124 may determine that stamp collecting is not relevant to the location-specific financial data to be provided to the client. In some examples, the theme relevance subsystem 124 may receive theme data describing themes derived by the theme extractor subsystem 126. In some examples, the theme relevance subsystem 124 may also receive user goal data, for example, from a user goal data store 140. For example, the theme relevance subsystem 124 may compare the themes returned by the theme extractor 126 to the user goal data to determine themes that are relevant to the user's financial goals. In some examples, the theme relevance subsystem 124 may also receive location data 144 and/or 146. The theme relevance subsystem 124 may compare themes returned by the theme extractor 126 to identify themes that are relevant to the selected location. For example, a purchase feed 119 may return a theme indicating that the user purchases a particular type of laundry soap that is available in some areas, but not others. Such a theme may not be relevant unless the selected location is one of the areas where the laundry soap is unavailable. Theme data generated by the theme extractor subsystem 126 and/or determined to be relevant by the theme relevance subsystem 124 may be stored, for example, at a personal theme data store 136.

A user model engine subsystem 130 may generate location-specific financial data for the user in any suitable way. For example, the user model engine 130 may generate a spending model for the user based, for example, on user goal data from the user goal data store 140 as well as the theme data. For example, the user model engine 130 may convert relevant themes into expense categories for the user. The user model engine subsystem 130 may also receive geographic data (e.g., from a geographic data store 138). The geographic data may describe the location indicated by location data 144 and/or 146. The user model engine subsystem 130 may generate location-specific user expenses for the user based on the expense categories and the geographic data. In some examples, as described herein, the user model engine subsystem 130 may also determine a likelihood that the user will meet one or more financial goals based on the location-specific user expenses.

A local UI generator subsystem 128 may generate a local UI 116 for sending to the user computing device 106. The user computing device 106 may be or include any suitable type of computing device such as, for example, a laptop computer, a desktop computer, a tablet computer, a smart phone, etc. The user computing device 106 may execute a local UI application 108. The local UI application 108 may be executed by one or more processors of the user computing device 106. The local UI application 108 may be configured to communicate with the geographic data system 102 including, for example, the local UI generator subsystem 128 of the geographic data system 102. In some examples, the local UI application 108 may also be configured to communicate with one or more of the custodial systems 109, 111, 112, 113 providing data feeds 119, 120, 122, 123 to the geographic data system 102. For example, the local UI application 108 may be configured to prompt the user 105 to authorize provision of one or more of the data feeds 119, 120, 122, 123 to the geographic data system 102.

The local UI application 108 may also be configured to prompt the user 105 to provide an indication of a geographic location (e.g., a location where the user 105 is considering a major asset purchase such as, for example, a house). The user 105 may provide the location in any suitable manner including, for example, by providing a name of the physical location, by manipulating a cursor on the local UI 116, etc. The local UI app 108 may generate location data 144 describing the selected location and provide the location data 144 to the geographic data system. In response, the geographic data system (e.g., the user model engine subsystem 130 and/or the local UI generator subsystem 128) may generate and/or update the local UI 116 to reflect location-specific financial data such as, for example, location-specific expense data and/or a likelihood that the user 105 will meet a financial goal.

A mobile UI generator subsystem 132 may generate a mobile UI 118 for sending to the user computing device 104. The user computing device 104 maybe or include any suitable type of computing device such as, for example, a laptop computer, a desktop computer, a tablet computer, a smart phone, etc. The user computing device 104 may be utilized by a user 107. In some examples, the user 107 may travel between geographic locations. To illustrate this, the user 107 is shown traveling in a vehicle 103, although the user 107 may move him or herself by any suitable mechanism or may remain stationary. The user 107 may carry the user computing device 104 with the user 107.

The user computing device 104 may execute a mobile UI application 110. The mobile UI application 110 may be configured to communicate with the geographic data system 102 including, for example, the mobile UI generator subsystem 132 of the geographic data system 102. In some examples, the mobile UI application 110 may also be configured to communicate with one or more of the custodial systems 109, 111, 112, 113 providing data feeds 119, 120, 122, 123 to the geographic data system 102. For example, the mobile UI application 110 may be configured to prompt the user 107 to authorize provision of one or more of the data feeds 119, 120, 122, 123 to the geographic data system.

The user computing device 104 may also comprise a location subsystem 115, which may include a location sensor, such as a Global Positioning System (GPS) transceiver, a Wi-Fi positioning system, etc. As the user 107 travels between geographic locations, the user computing device 104 may determine its new locations. The mobile UI application 110 may receive the location of the user computing device 104 (which often reflects the location of the user 107) and generate location data 146 to be provided to the geographic data system 102 (e.g., the mobile UI generator subsystem 132 thereof). The geographic data system 102 may generate a mobile UI 118 and serve the mobile UI to the mobile UI application 110. In some examples, the mobile UI application 110 may be configured to periodically query the location subsystem 115 to receive a current location of the user computing device 104. It the current location has changed from a previously-measured location by more than a threshold, then the mobile UI application 110 may be programmed to generate new location data 146 and provide the new location data 146 to the geographic data system 102, which may generate an updated mobile UI 118. In some examples, new location data 146 may be configured to trigger an interrupt or other suitable mechanism at the geographic data system 102 for prompting the geographic data system to determine the updated mobile UI 118 upon receiving the new location data.

In some examples, the location data 146 may represent the location sensed by another user device of the user 107, such as for example, a wearable computing device. The wearable computing device may provide its location to the user computing device 104, which may provide corresponding location data 146 to the geographic data system 102.

The various subsystems 124, 128, 132, 126, 130, 134 of the geographic data system 102 may be implemented utilizing any suitable combination of hardware or software. In some examples, one or more of the subsystems 124, 128, 132, 126, 130, 134 is implemented by a dedicated server or other computing device, such as a field programmable gate array (FPGA), an application specific integrated circuit (ASIC), etc. Also, in some examples, one or more of the subsystems 124, 128, 132, 126, 130, 134 may be implemented as software executed by one or more computing devices of the geographic data system 102. Each of the subsystems 124, 128, 132, 126, 130, 134 may be configured to execute all or part of the functionality for determining and/or presenting location-specific financial data.

Figure 10:
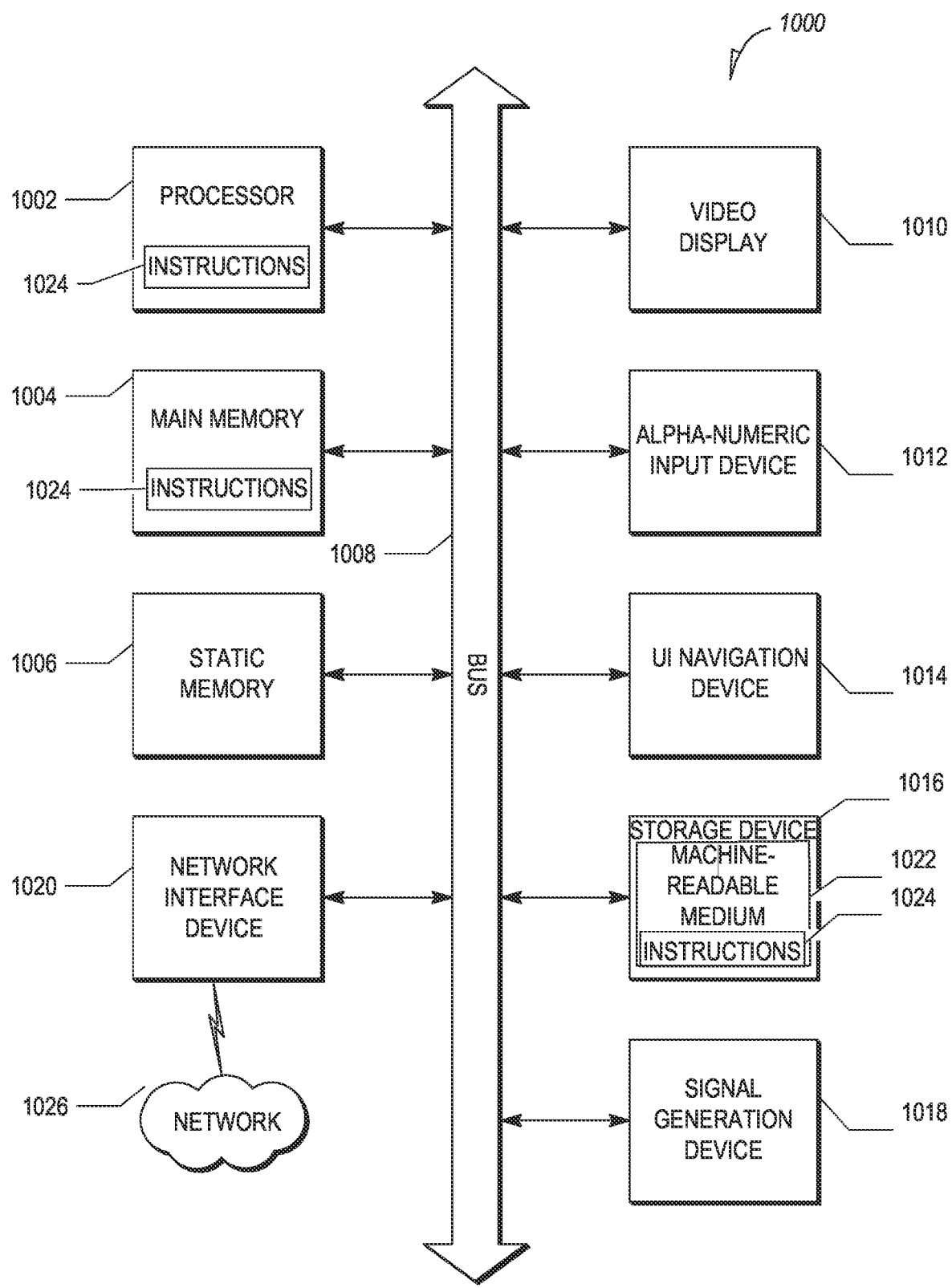
FIG. 10 is a block diagram illustrating a computing device hardware architecture, within which a set or sequence of instructions can be executed to cause the machine to perform examples of any one of the methodologies discussed herein.

The various components 102, 104, 106, 109, 111, 112, 113, etc. of the environment 100 may be in communication with one another by any suitable means such as, for example, any sort of network (see network 1026 in FIG. 10). The network may comprise any suitable network element operated according to any suitable network protocol. For example, one or more portions of network may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a Wi-Fi network, a WiMax network, another type of network, or a combination of two or more such networks.

Figure 2:
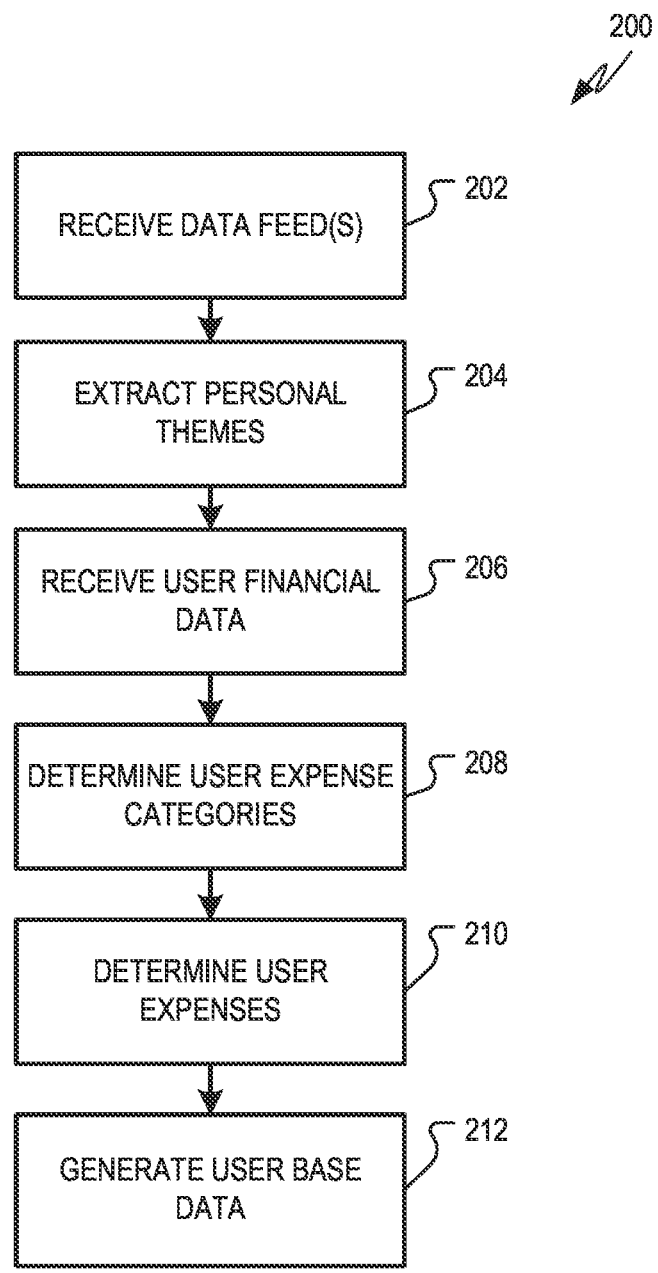
FIG. 2 is a flow chart showing one example of a process flow that may be executed by the geographic data system of FIG. 1 to generate user base data for generating location-specific financial data.

FIG. 2 is a flow chart showing one example of a process flow 200 that may be executed by the geographic data system 102 (e.g., one or more subsystems of the geographic data system 102) to generate user base data that may be used to generate location-specific financial data. User base data may be data generated for a particular user, for example, in advance of receiving location data 144, 146 to generate a UI 116, 118. For example, user base data may describe expenses, financial goals, and/or other relevant data describing a user that may be combined with location data (e.g., when received from a UI application executing at a user computing device) to generate location-specific financial data. User base data may be generated and/or updated independent of the receipt of location data. In this way, the geographic data system 102 may improve the efficiency of its processing to create location-specific financial data upon receipt of the location data. In some examples, the process flow 200 may be executed multiple times to generate base data for multiple users, allowing the geographic data system to quickly and efficiently generate a UI, such as one or both of UIs 116, 118 for those users. The process flow 200 is described with respect to the example environment 100 of FIG. 1, though it will be appreciated that the process flow 200 may be executed in any suitable environment.

At action 202, the geographic data system 102 (e.g., the theme extractor subsystem 126) may receive data feeds, such as data feeds 119, 120, 122, 123 described above. Data feeds 119, 120, 122, 123 may be received on a continuous basis, for example, as the custodial systems 109, 111, 112, 113 for the respective data feeds receive new data. Also, in some examples, data feeds 119, 120, 122, 123 may be received periodically and/or in response to a query from the geographic data system 102. In some examples, a customer may authorize the geographic data system 102 to receive one or more of the data feeds 119, 120, 122, 123. For example, the user may provide the geographic data system 102 with credentials for logging-in to one or more of the custodial systems 109, 111, 112, 113 to receive data feeds 119, 120, 122, 123. Also, in examples, the user may log-in to one or more of the custodial systems 109, 111, 112, 113 and provide authorization data authorizing one or more of the custodial systems 109, 111, 112, 113 to provide the data feeds 119, 120, 122, 123. In some examples where one or more of the data feeds 119, 120, 122, 123 includes data describing more than one user, the geographic data system 102 (e.g., the theme extractor subsystem 126) may extract and consider only data related to the user being considered.

At action 204, the theme extractor 126 may extract one or more themes from data received via one or more of the data feeds 119, 120, 122, 123. Themes may be extracted in any suitable manner. In some examples, themes may be extracted by examining key words present in data received via the data feeds 119, 120, 122, 123. For example, the theme extractor 126 may store keywords describing various potential themes. The theme extractor 126 may search for the keywords in the data received via the data feeds 119, 120, 122, 123. If more than a keyword threshold number of instances of a keyword for a particular theme appear in the data, the theme extractor subsystem 126 may determine that the particular theme is present. In another example, if keywords for a particular theme appear in the data at a concentration greater than a concentration threshold (e.g., greater than X keywords per Y words of data). In some examples, prior to extracting themes, the theme extractor subsystem 126 may tokenize the feed data and/or perform other suitable pre-processing. For example, keywords and/or keyword concentrations may be determined by token (e.g., more than X keyword tokens and/or greater than X keyword tokens per Y tokens of data). Also, in some examples, the theme relevance subsystem 124 may determine relevant themes from among the themes selected at action 204.

At action 206, the geographic data system 102 (e.g., the user model engine subsystem 130) may receive user financial data. User financial data may describe, for example, assets held by the user. Assets held by the user may include securities, bank accounts, etc., as well as other assets including homes, commodities, etc. User financial data may also, in some examples, include financial goals of the user. A financial goal may be a purchase and/or financial state the user would like to achieve and may be described by cost data describing a cost of the financial goal and timing data describing a date for the financial goal.

At action 208, the geographic data system 102 (e.g., the user model engine subsystem 130) may determine user expense categories based at least in part on the themes generated by the theme extractor subsystem 126 (e.g., relevant themes as determined by the them relevance subsystem 124). For example, the user model engine subsystem 130 may examine the themes (e.g., relevant themes) and identify themes that have associated expenses. For example, an indication that the user has or will soon have an elderly parent in need of care may be associated with nursing home or other suitable care expenses. It will be appreciated that some themes may not be associated with an expense category.

At action 210, the geographic data system 102 (e.g., the user model engine subsystem 130) may determine user expenses. For example, the user model engine subsystem 130 may assign a cost value to the cost categories determined at action 208. Assigning a cost value to a cost category may include examining the user's assets, income, etc., to determine the amount of money that the user is likely to spend on the expense. In some examples, assigning a cost value to cost categories may include referring to historical purchase data describing purchases that the user has made in the past. In some examples, the user expenses determined at action 210 may be expenses at the user's current home and may include the user's mortgage on the user's current home as well as location-specific expenses for the location of the user's current home.

At action 212, the geographic data system 102 (e.g., the user model engine subsystem 130) may generate user base data. User base data for the user may include the data determined at actions 208, 210, and 212. User base data may be stored, for example, at the geographic data system 102 for later use when generating a UI, such as 116, 118.

Figure 3:
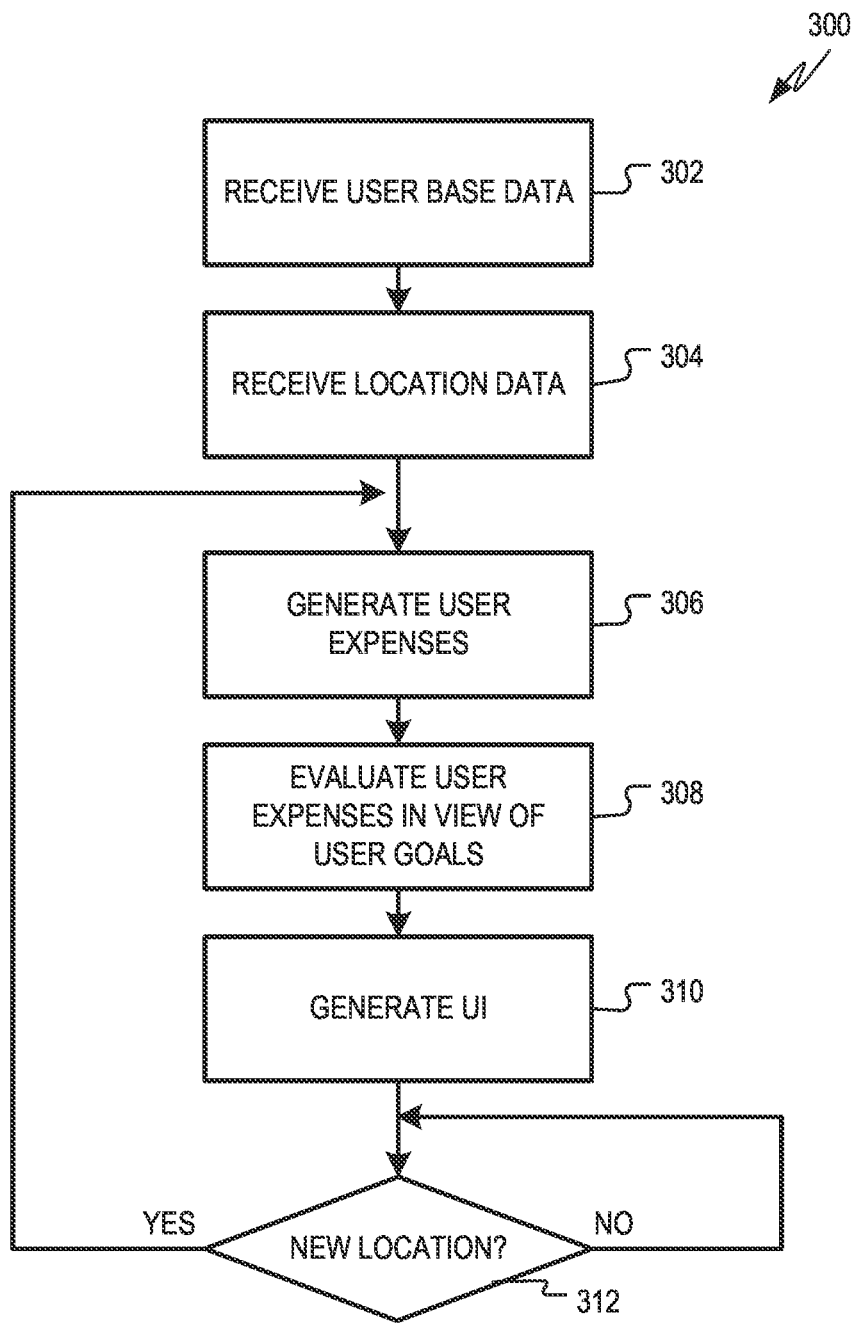
FIG. 3 is a flow chart showing one example of a process flow that may be executed by the geographic data system of FIG. 1 to generate a local UI.

FIG. 3 is a flow chart showing one example of a process flow 300 that may be executed by the geographic data system 102 to generate a local UI 116. At action 302, the geographic data system 102 (e.g., the user model engine subsystem 130) may receive user base data for the user 105 who will receive the local UI 116. At action 304, the geographic data system 102 (e.g., the local UI generator subsystem 128) may receive location data describing a location to be described by the local UI 116. In some examples, the user 105 may provide the location by moving a cursor or other pointing object provided by the local UI application 108. Location data 144 may be sent from the local UI application 108 to the geographic data system 102.

At action 306, the geographic data system 102 (e.g., the user model engine subsystem 130) may generate user expenses for the location described by the location data 144. Optionally, at action 308, the geographic data system 102 (e.g., the user model engine subsystem 130) may evaluate one or more user goals in view of the user expenses generated at action 306. For example, the user model engine subsystem 130 may determine whether the user's spend level and asset level in view of the expenses determined at action 306 will permit the user 105 to have sufficient assets to meet the cost of a user goal at the time of the user goal. At action 310, the geographic data system (e.g., the local UI generator subsystem 128) may generate the local UI 116. Generating the location UI 116 may comprise generating one or more UI files and/or generating data to update UI files already present at the user computing device 104. The local UI 116 may include data describing the user expenses determined at action 306. In some examples, the local UI 116 may show relative user expenses indicating the difference between the user expenses determined at action 306 for the received location and user expenses at the user's current home (e.g., indicated by the user base data). In some examples, the local UI 116 includes a map including an indication of the location received at action 304.

Optionally, at 312, the geographic data system 102 may determine if a new location is provided for the user computing device 104. For example, if the user 107 moves to a new location, taking the user computing device 104 with him or her, the user computing device 104 (e.g., the mobile UI application 110) may be configured to provide new location data to the geographic data system 102. The geographic data system 102 may be configured to compare newly received location data to the previous location data. In some examples, the geographic data system 102 may determine that a new location is received if the location described by the newly received location data differs from the previously location by more than a threshold amount. If a new location is received, the geographic data system 102 may return to action 306 and proceed based on the newly receive location data. In some examples, if no new location data is received, the geographic data system 102 may continue to wait for new location data. In some examples, when a new location is received, the geographic data system 102 is configured to send an alert message to the customer computing device. In some examples, the alert message may be or include an interrupt to awaken the user computing device 104 and/or mobile UI application 110 and an instruction to display an updated or newly generated mobile UI 118.

Figure 4:
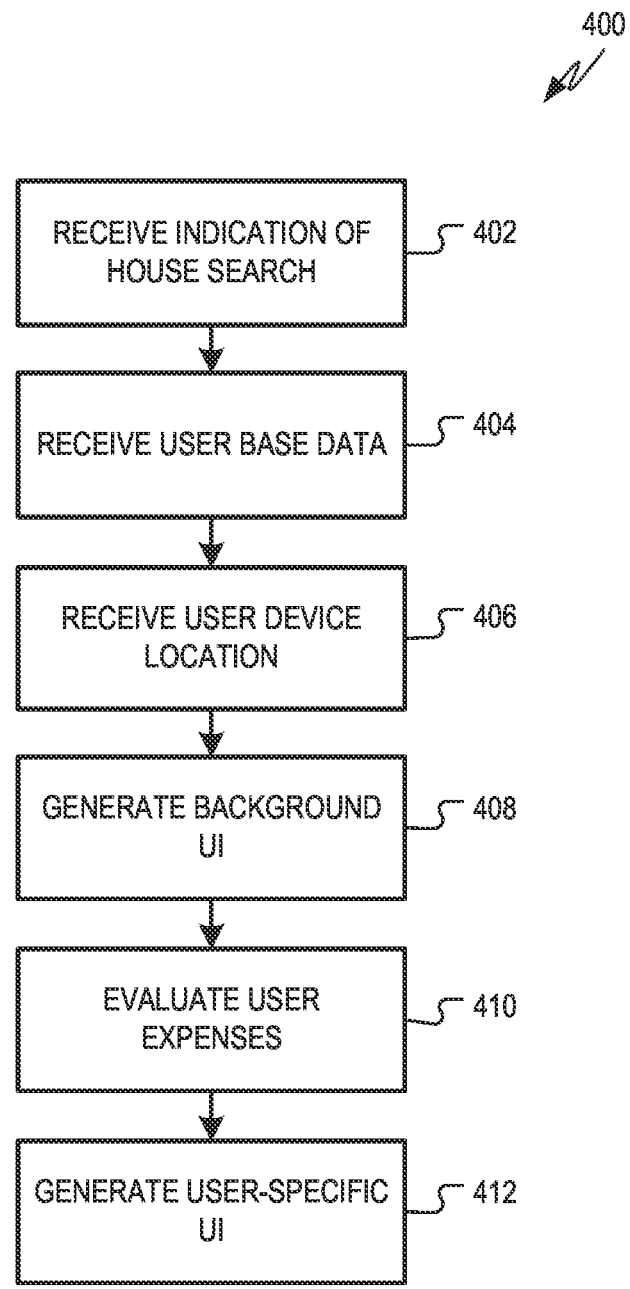
FIG. 4 is a flow chart showing one example of a process flow that may be executed by the geographic data system of FIG. 1 to generate the mobile UI.

FIG. 4 is a flow chart showing one example of a process flow 400 that may be executed by the geographic data system 102 to generate the mobile UI 118. At action 402, the geographic data system 102 (e.g., the mobile UI generator subsystem 132 thereof) may receive an indication of a mobile search. For example, the user 107 may provide an indication or request for a mobile search via the mobile UI application 110. At action 404, the geographic data system (e.g., the user model engine subsystem 130) may receive user base data. At action 406, the geographic data system 102 may receive location data 146 from the mobile UI application 110. The location data 146, as described herein, may indicate a current location of the user computing device 104 and may be likely to indicate the current location of the user 107.

At optional action 408, the geographic data system 102 (e.g., the mobile UI generator subsystem 132) may generate a background UI and serve the background UI to the mobile UI application 110. The background UI be provided to the user 107 while the geographic data system 102 generates the mobile UI 118. In some examples, the background UI may be populated with general information describing the location received at action 406. For example, the background UI may not include information specific to the user.

At action 410, the geographic data system 102 (e.g., the user model engine subsystem 130) may evaluate user expenses in view of the location indicated at action 406. At action 412, the geographic data system 102 (e.g., the mobile UI generator subsystem 132) may generate the mobile UI 118 and serve the mobile UI 118 to the mobile UI application 110 for display to the user 107. The mobile UI 118 may include data describing the user expenses determined at action 410. In some examples, the mobile UI 118 may show relative user expenses indicating the difference between the user expenses determined at action 410 for the received location and user expenses at the user's current home (e.g., indicated by the user base data). In some examples, the mobile UI 118 includes a map including an indication of the location received at action 406.

Figure 5:
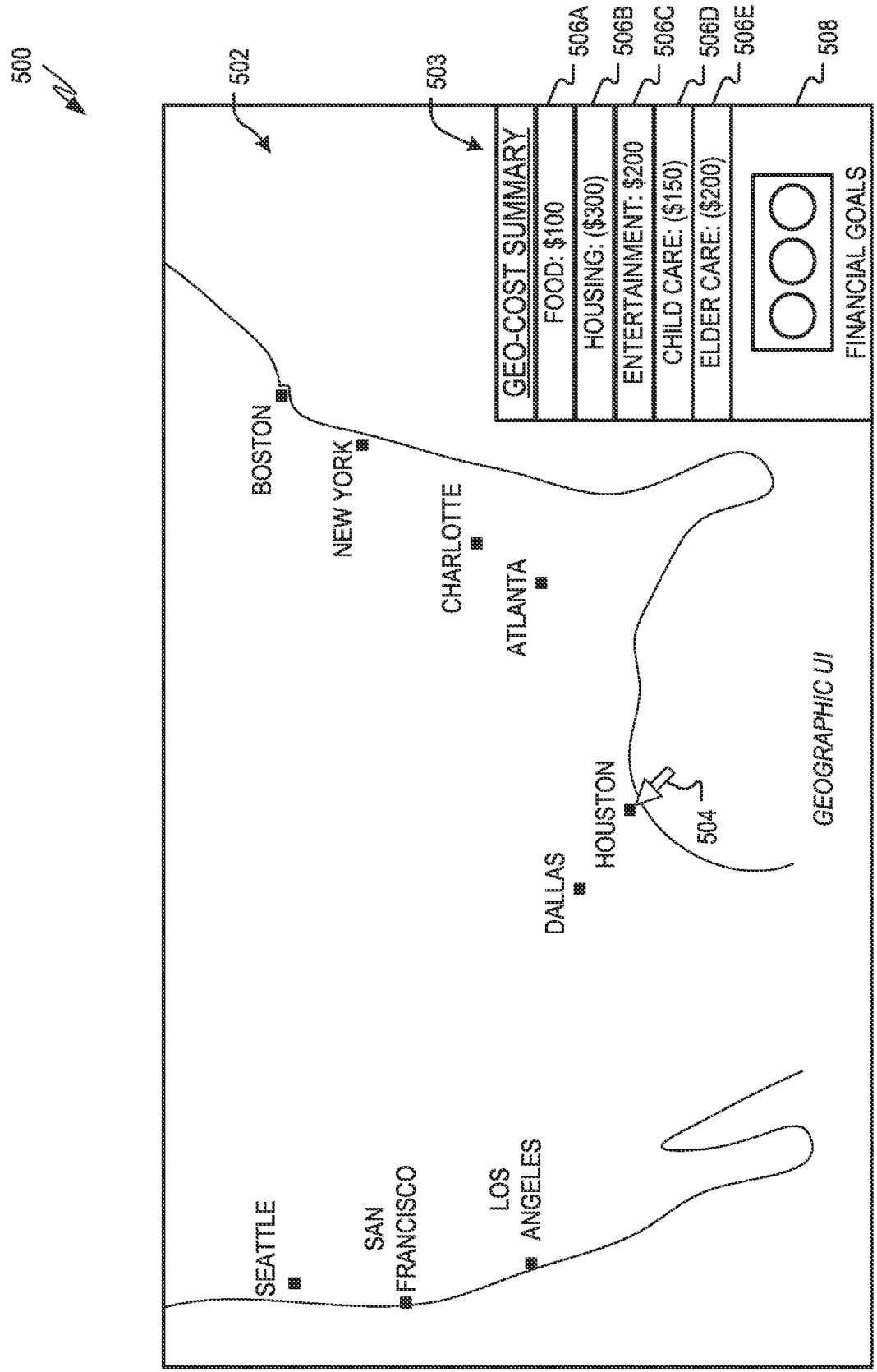
FIG. 5 is one example of an interface page.

FIG. 5 is one example of an interface page 500. The interface page 500 is an example that may be provided as part of the local UI 116 and/or the mobile UI 118. The interface page 500 comprises a map section 502. In the example of FIG. 5, the map section 502 includes all of the United States, with cities as indicated. The map section 502 includes a cursor 504 that may be movable by the user utilizing any suitable input/output (I/O) device of a user computing device such as, for example, a mouse, a touch screen, a track ball, etc. The user may position the cursor 504 over a geographic location. In response the UI application on the user computing device may determine the location to which the cursor is pointing and provide the location to the geographic data system.

The interface page 500 also includes a location-specific financial data field 503. The field 503 may include various location-specific user expense fields 506A, 506B, 506C, 506D, 506E. Each of the fields 506A, 506B, 506C, 506D, 506E shows an example expense level. Expense levels shown at fields 506A, 506B, 506C, 506D, 506E may be indicated on a periodic basis (e.g., monthly, yearly, quarterly, etc.). In the example of FIG. 5, the expense levels shown in the fields 506A, 506B, 506C, 506D, 506E are relative expenses, for example, measured relative to the expenses at the user's current home. In some examples, the expense levels shown at fields 506A, 506B, 506C, 506D, 506E are absolute.

The field 503 also includes a financial goal field 508. The financial goal field 508 includes an indication of the likelihood that the user will meet one or more financial goals at the level of spending indicated by the selected location. Any suitable graphic or other indicator of likelihood may be used. For example, in FIG. 5, the financial goal field includes a stoplight. A green light may indicate that the user would be on track to meet their financial goal or goals at the indicated location. A yellow light may indicate that the user would be at risk of not meeting their financial goal or goals at the indicated location. A red light may indicate that the user is not likely to meet their financial goal or goals at the indicated location. In some examples, a single financial goal field 508 may be included and may indicate an aggregate likelihood for all of the user's financial goals. In some examples, multiple financial goal fields may be included with each field corresponding to a particular goal.

Figure 6:
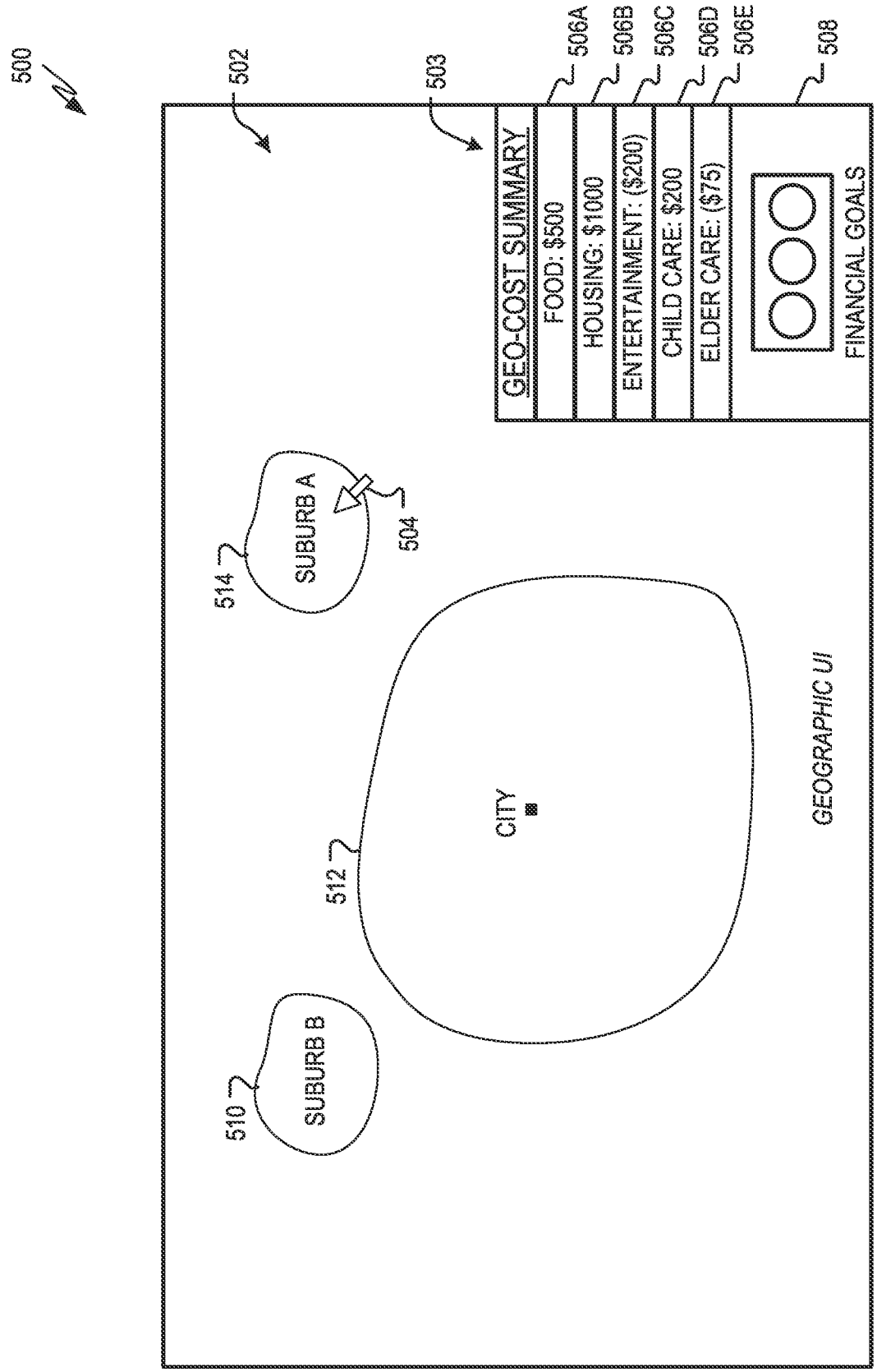
FIG. 6 is another example of the interface page of FIG. 5 at a city level scale.

Although the map field 502 shown in FIG. 5 is presenting at a scale showing all of the continental United States, the map field 502 may be configured at any suitable scale. For example, FIG. 6 shows another example of the interface page 500 at a city level scale. At the map field 502, the scale is zoomed in to a city level. For example, the user may position the cursor 504 at the city 512 and/or a suburbs 510, 514 to generate location data to be provided to the geographic data system 102.

Figure 7:
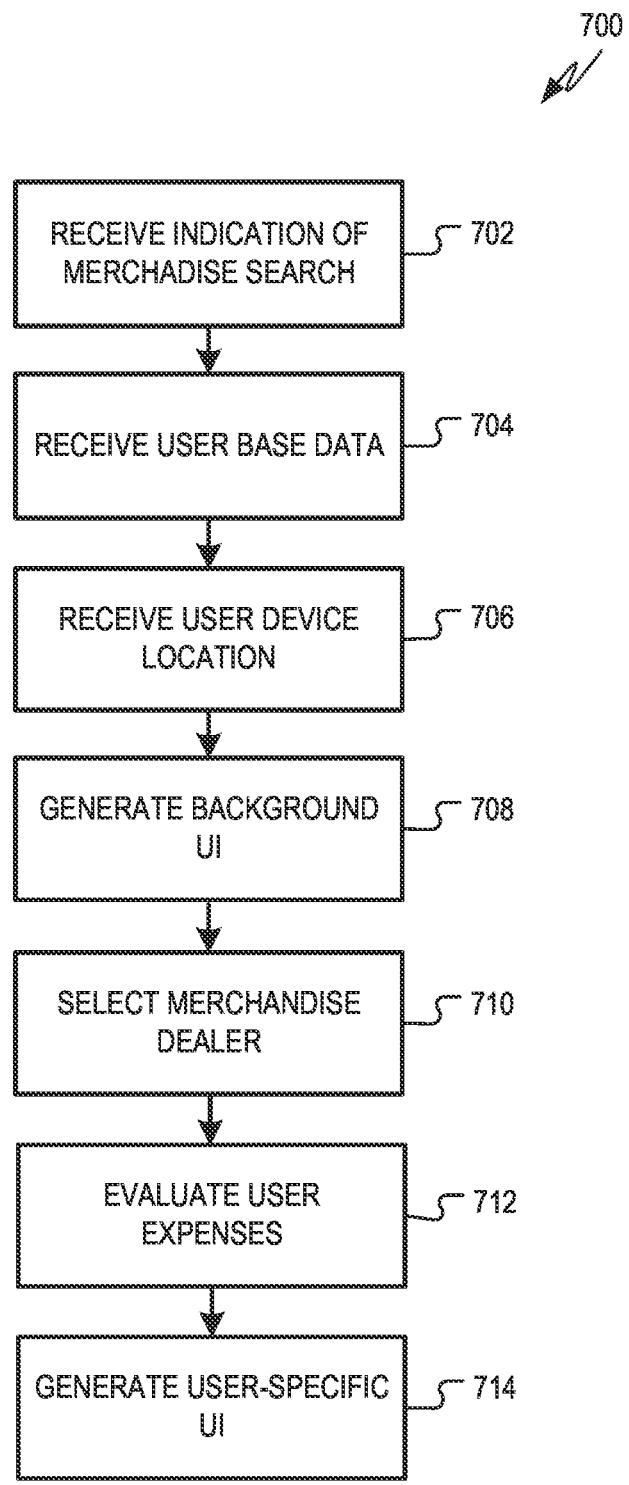
FIG. 7 is a flow chart showing a process flow that may be executed by the geographic data system to generate location-specific data for the purchase of a merchandise item.

As described herein, location-specific financial data may be generated for any suitable potential asset purchase by a user. For example, FIG. 7 is a flow chart showing a process flow 700 that may be executed by the geographic data system 102 to generate location-specific data for the purchase of a merchandise item (e.g., a car). At action 702, the geographic data system 102 may receive an indication of a merchandise search. For example, a user (e.g., user 105 and/or user 107) may request a merchandise search via an application 108, 110 executing at a user computing device 104, 106. At action 704, the geographic data system 102 may receive user base data for the user. At action 706, the geographic data system 102 may receive user device location data, for example, as sensed by a location subsystem 115 of the user computing device (e.g., location subsystem 115). At optional action 708, the geographic data system 102 may generate a background UI and provide the background UI to the user computing device. In some examples, the background UI may include information about the merchandise sold by the dealer identified at action 706.

At action 710, the geographic data system 102 may select a merchandise dealer, for example, based on the location of the user computing device received at action 706. For example, the geographic data system 102 may match the location to a location of a dealer of merchandise (e.g., cars, boats, etc.). At action 712, the geographic data system 102 may evaluate user expenses in view of the potential purchase of a merchandise item. For example, the geographic data system 102 may receive dealer data describing merchandise sold by the merchandise dealer. In some examples, the geographic data system 102 may prompt the user (e.g., through the UI) to select a merchandise item under consideration for purchase, or may select the merchandise item. User expenses may be evaluated in view of a merchandise expense associated with a potential purchase of the selected merchandise item. For example, the geographic data system 102 may subtract the price of the merchandise item from the user's assets and/or add a monthly payment to the user's periodic expenses. At action 714, the geographic data system may generate a location-specific UI and serve the UI to the user. The location-specific UI may include data describing the user expenses and/or may indicate a likelihood that the user will meet one or more financial goals in view of a potential purchase of the car. In some examples, the geographic data system 102 may receive additional location data, determine that the additional location data describes a new location, and provide to the user computing device an alert message indicating the presence of an updated UI, for example, similar to action 312 described above.

Figure 8:
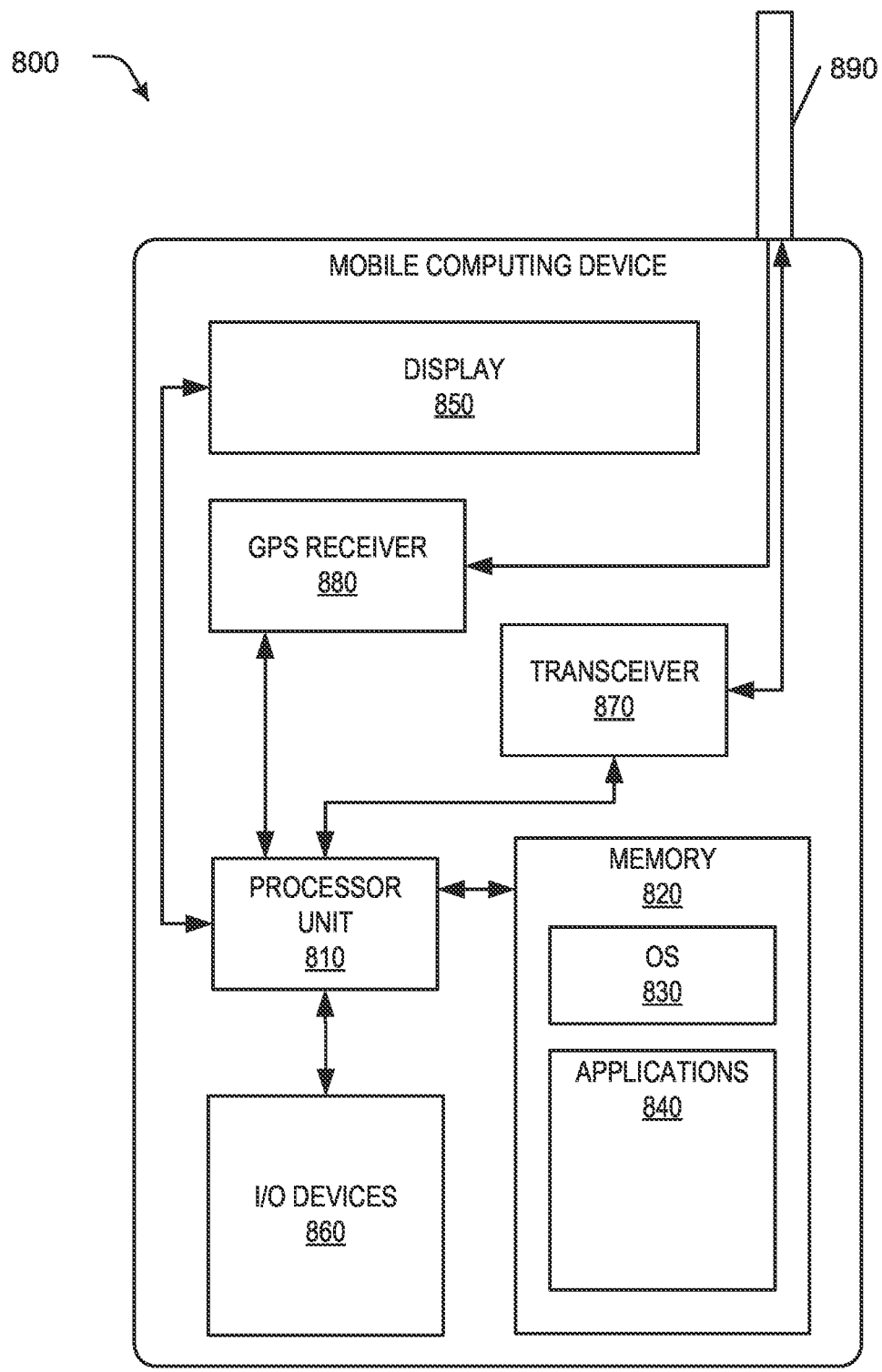
FIG. 8 is a block diagram showing one example of a software architecture for a computing device.

FIG. 8 is a block diagram showing an example architecture 800 of a mobile computing device. For example, the architecture 800 may describe any of the user computing devices 104, 106. The architecture 800 comprises a processor unit 810. The processor unit 810 may include one or more processors. Any of a variety of different types of commercially available processors suitable for mobile computing devices may be used (for example, an XScale architecture microprocessor, a Microprocessor without Interlocked Pipeline Stages (MIPS) architecture processor, or another type of processor). A memory 820, such as a Random Access Memory (RAM), a Flash memory, or other type of memory or data storage, is typically accessible to the processor. The memory 820 may be adapted to store an operating system (OS) 830, as well as application programs 840. In some examples, the OS may implement software interrupts that cause the architecture 800 to pause its current task and execute an interrupt service routine (ISR) when an interrupt is received. For example, when an instance of the mobile UI 118 and/or the local UI 116 is provided to a user computing device, it may include or trigger a software interrupt. The ISR for the software interrupt may prompt the appropriate application 108, 110 to launch and/or update the received UI.

The processor unit 810 may be coupled, either directly or via appropriate intermediary hardware, to a display 850 and to one or more input/output (I/O) devices 860, such as a keypad, a touch panel sensor, a microphone, and the like. Such I/O devices 860 may include a touch sensor for capturing fingerprint data, a camera for capturing one or more images of the user, a retinal scanner, or any other suitable devices. Similarly, in some examples, the processor 810 may be coupled to a transceiver 870 that interfaces with an antenna 890. The transceiver 870 may be configured to both transmit and receive cellular network signals, wireless data signals, or other types of signals via the antenna 890, depending on the nature of the mobile computing device implemented by the architecture 800. Although one transceiver 870 is shown, in some examples, the architecture 800 includes additional transceivers. For example, a wireless transceiver may be utilized to communicate according to an IEEE 802.11 specification, such as Wi-Fi and/or to a short range communication medium. Some short range communication mediums, such as NFC, may utilize a separate, dedicated transceiver. Further, in some configurations, a GPS receiver 880 may also make use of the antenna 890 to receive GPS signals. In addition to or instead of the GPS receiver 880, any suitable location-determining sensor may be included and/or used including, for example, a Wi-Fi positioning system. In some examples, the architecture (e.g., processor unit 810) may also support a hardware interrupt. In response to a hardware interrupt, the processor unit 810 may pause its processing and execute an interrupt service routine (ISR). For example, an alert message may include and/or trigger a hardware interrupt. The ISR for the hardware interrupt may launch the appropriate UI (e.g. UI 116 or 118) and display the received alert message.

Figure 9:
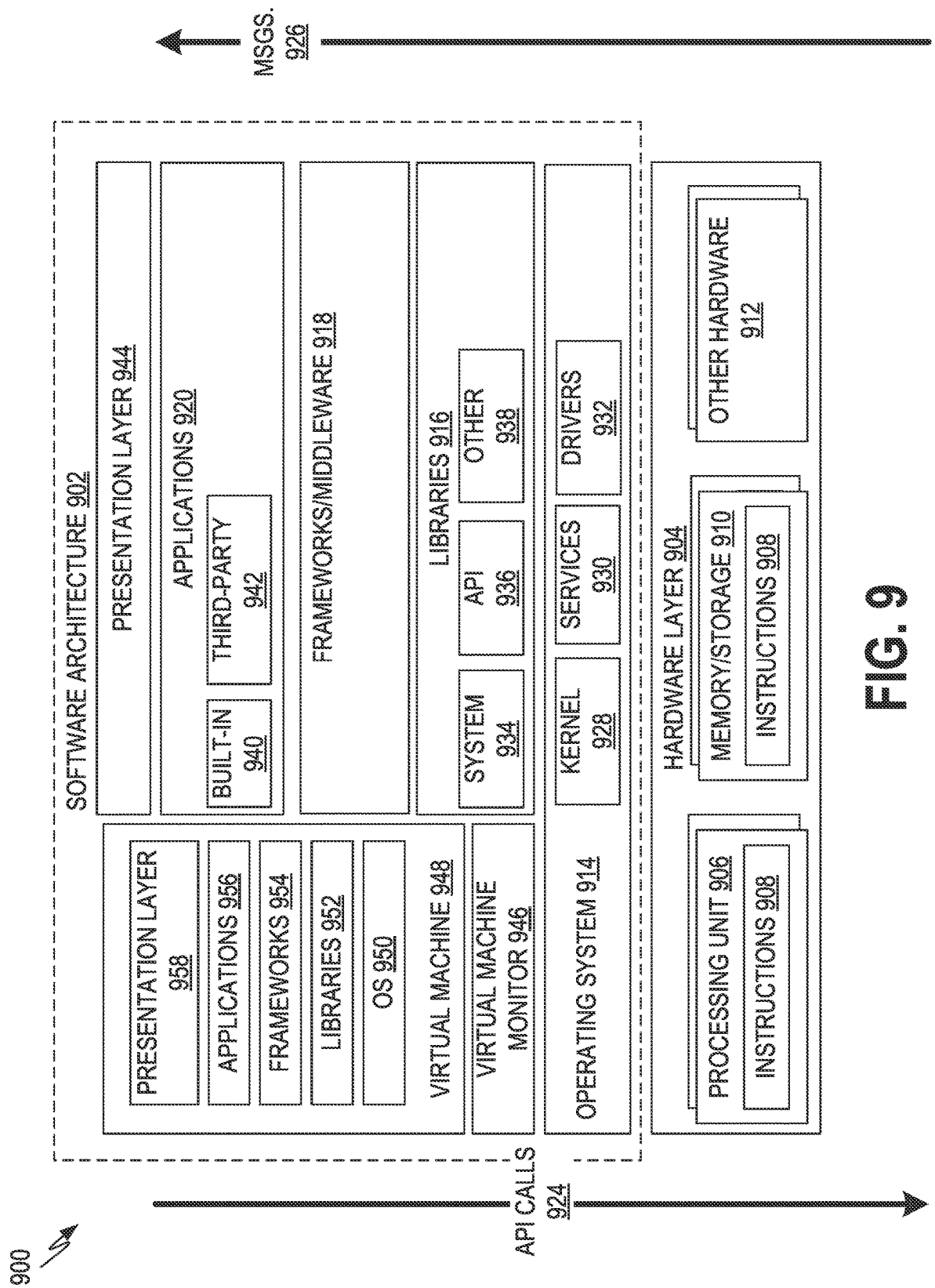
FIG. 9 is a block diagram illustrating a computing device hardware architecture, within which a set or sequence of instructions can be executed to cause the machine to perform examples of any one of the methodologies discussed herein.

FIG. 9 is a block diagram 900 showing one example of a software architecture 902 for a computing device. The architecture 902 maybe used in conjunction with various hardware architectures, for example, as described herein. FIG. 9 is merely a non-limiting example of a software architecture 902 and many other architectures may be implemented to facilitate the functionality described herein. The software architecture 902 may be executed on hardware such as, for example, the geographic data system 102, any of the subsystems 124, 126, 128, 130, 132, 134 of the geographic data system 102, any of the user computing devices 104, 106, any of the custodial systems 109, 111, 112, 113, etc. A representative hardware layer 904 is illustrated and can represent, for example, any of the above referenced computing devices. In some examples, the hardware layer 904 may be implemented according to the architecture 902 of FIG. 9 and/or the architecture 1000 of FIG. 10.

The representative hardware layer 904 comprises one or more processing units 906 having associated executable instructions 908. Executable instructions 908 represent the executable instructions of the software architecture 902, including implementation of the methods, modules, components, and so forth of FIGS. 1-7. Hardware layer 904 also includes memory and/or storage modules 910, which also have executable instructions 908. Hardware layer 904 may also comprise other hardware as indicated by other hardware 912 which represents any other hardware of the hardware layer 904, such as the other hardware illustrated as part of hardware architecture 1100.

In the example architecture of FIG. 9, the software 902 may be conceptualized as a stack of layers where each layer provides particular functionality. For example, the software 902 may include layers such as an operating system 914, libraries 916, frameworks/middleware 918, applications 920 and presentation layer 944. Operationally, the applications 920 and/or other components within the layers may invoke application programming interface (API) calls 924 through the software stack and receive a response, returned values, and so forth illustrated as messages 926 in response to the API calls 924. The layers illustrated are representative in nature and not all software architectures have all layers. For example, some mobile or special purpose operating systems may not provide a frameworks/middleware layer 918, while others may provide such a layer. Other software architectures may include additional or different layers.

The operating system 914 may manage hardware resources and provide common services. The operating system 914 may include, for example, a kernel 928, services 930, and drivers 932. The kernel 928 may act as an abstraction layer between the hardware and the other software layers. For example, the kernel 928 may be responsible for memory management, processor management (e.g., scheduling), component management, networking, security settings, and so on. The services 930 may provide other common services for the other software layers. In some examples, the services 930 include an interrupt service. The interrupt service may detect the receipt of an interrupt and, in response, cause the architecture 902 to pause its current processing and execute an interrupt service routine (ISR) when an interrupt is received. For example, when a new version of the UI 116, 118 is received by the user computing device 104, 106, it may trigger an interrupt at the user computing device 104, 106. The ISR may prompt the user computing device 104, 106 to display and/or update the relevant UI 116, 118. Similarly, in some examples, when the geographic data system 102 receives new location data 146 (e.g., location data differing from previous location data by more than a threshold distance), it may trigger an interrupt at the geographic data system 102 (and/or at the mobile UI generator subsystem 132 thereof). The ISR for the interrupt may prompt the geographic data system 102 to re-generate the mobile UI 118, for example, based on the newly received location.

The drivers 932 may be responsible for controlling or interfacing with the underlying hardware. For instance, the drivers 932 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 916 may provide a common infrastructure that may be utilized by the applications 920 and/or other components and/or layers. The libraries 916 typically provide functionality that allows other software modules to perform tasks in an easier fashion than to interface directly with the underlying operating system 914 functionality (e.g., kernel 928, services 930 and/or drivers 932). The libraries 916 may include system 934 libraries (e.g., C standard library) that may provide functions such as memory allocation functions, string manipulation functions, mathematic functions, and the like. In addition, the libraries 916 may include API libraries 936 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 9D in a graphic content on a display), database libraries (e.g., SQLite that may provide various relational database functions), web libraries (e.g., WebKit that may provide web browsing functionality), and the like. The libraries 916 may also include a wide variety of other libraries 938 to provide many other APIs to the applications 920 and other software components/modules.

The frameworks 918 (also sometimes referred to as middleware) may provide a higher-level common infrastructure that may be utilized by the applications 920 and/or other software components/modules. For example, the frameworks 918 may provide various graphic user interface (GUI) functions, high-level resource management, high-level location services, and so forth. The frameworks 918 may provide a broad spectrum of other APIs that may be utilized by the applications 920 and/or other software components/modules, some of which may be specific to a particular operating system or platform.

The applications 920 includes built-in applications 940 and/or third party applications 942. Examples of representative built-in applications 940 may include, but are not limited to, a contacts application, a browser application, a book reader application, a location application, a media application, a messaging application, and/or a game application. Third party applications 942 may include any of the built in applications as well as a broad assortment of other applications. In a specific example, the third party application 942 (e.g., an application developed using the Android™ or iOS™ software development kit (SDK) by an entity other than the vendor of the particular platform) may be mobile software running on a mobile operating system such as iOS™, Android™, Windows® Phone, or other mobile computing device operating systems. In this example, the third party application 942 may invoke the API calls 924 provided by the mobile operating system such as operating system 914 to facilitate functionality described herein.

The applications 920 may utilize built in operating system functions (e.g., kernel 928, services 930 and/or drivers 932), libraries (e.g., system 934, APIs 936, and other libraries 938), frameworks/middleware 918 to create user interfaces to interact with users of the system. Alternatively, or additionally, in some systems interactions with a user may occur through a presentation layer, such as presentation layer 944. In these systems, the application/module "logic" can be separated from the aspects of the application/module that interact with a user.

Some software architectures utilize virtual machines. For example, the geographic data system 102 and/or some or all of the subsystems 124, 126, 128, 130, 132, 134 thereof may be executed on one or more virtual machines executed by one or more server computing machines. In the example of FIG. 9, this is illustrated by virtual machine 948. A virtual machine creates a software environment where applications/modules can execute as if they were executing on a hardware computing device. A virtual machine is hosted by a host operating system (operating system 914) and typically, although not always, has a virtual machine monitor 946, which manages the operation of the virtual machine as well as the interface with the host operating system (i.e., operating system 914). A software architecture executes within the virtual machine such as an operating system 950, libraries 952, frameworks/middleware 954, applications 956 and/or presentation layer 958. These layers of software architecture executing within the virtual machine 948 can be the same as corresponding layers previously described or may be different.

FIG. 10 is a block diagram illustrating a computing device hardware architecture 1000, within which a set or sequence of instructions can be executed to cause the machine to perform examples of any one of the methodologies discussed herein. For example, the architecture 1000 may execute the software architecture 902 described with respect to FIG. 9. The architecture 1000 may operate as a standalone device or may be connected (e.g., networked) to other machines. In a networked deployment, the architecture 1000 may operate in the capacity of either a server or a client machine in server-client network environments, or it may act as a peer machine in peer-to-peer (or distributed) network environments. The architecture 1000 can be implemented in a personal computer (PC), a tablet PC, a hybrid tablet, a set-top box (STB), a personal digital assistant (PDA), a mobile telephone, a web appliance, a network router, switch or bridge, or any machine capable of executing instructions (sequential or otherwise) that specify actions to be taken by that machine.

Example architecture 1000 includes a processor unit 1002 comprising at least one processor (e.g., a central processing unit (CPU), a graphics processing unit (GPU) or both, processor cores, compute nodes, etc.). The architecture 1000 may further comprise a main memory 1004 and a static memory 1006, which communicate with each other via a link 1008 (e.g., bus). The architecture 1000 can further include a video display unit 1010, an alphanumeric input device 1012 (e.g., a keyboard), and a user interface (UI) navigation device 1014 (e.g., a mouse). In some examples, the video display unit 1010, input device 1012 and UI navigation device 1014 are incorporated into a touch screen display. The architecture 1000 may additionally include a storage device 1016 (e.g., a drive unit), a signal generation device 1018 (e.g., a speaker), a network interface device 1020, and one or more sensors (not shown), such as a global positioning system (GPS) sensor, compass, accelerometer, or other sensor.

In some examples, the processor unit 1002 or other suitable hardware component may support a hardware interrupt. In response to a hardware interrupt, the processor unit 1002 may pause its processing and execute an interrupt service routine (ISR), for example, as described herein.

The storage device 1016 includes a machine-readable medium 1022 on which is stored one or more sets of data structures and instructions 1024 (e.g., software) embodying or utilized by any one or more of the methodologies or functions described herein. The instructions 1024 can also reside, completely or at least partially, within the main memory 1004, static memory 1006, and/or within the processor 1002 during execution thereof by the architecture 1000, with the main memory 1004, static memory 1006, and the processor 1002 also constituting machine-readable media. Instructions stored at the machine-readable medium 1022 may include, for example, instructions for implementing the software architecture 902, instructions for executing any of the features described herein, etc.

While the machine-readable medium 1022 is illustrated in an example to be a single medium, the term "machine-readable medium" can include a single medium or multiple media (e.g., a centralized or distributed database, and/or associated caches and servers) that store the one or more instructions 1024. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including, but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 1024 can further be transmitted or received over a communications network 1026 using a transmission medium via the network interface device 1020 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 6G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Various components are described in the present disclosure as being configured in a particular way. A component may be configured in any suitable manner. For example, a component that is or that includes a computing device may be configured with suitable software instructions that program the computing device. A component may also be configured by virtue of its hardware arrangement or in any other suitable manner.

The above description is intended to be illustrative, and not restrictive. For example, the above-described examples (or one or more aspects thereof) can be used in combination with others. Other embodiments can be used, such as by one of ordinary skill in the art upon reviewing the above description. The Abstract is to allow the reader to quickly ascertain the nature of the technical disclosure, for example, to comply with 37 C.F.R. § 1.72(b) in the United States of America. It is submitted with the understanding that it will not be used to interpret or limit the scope or meaning of the claims.

Also, in the above Detailed Description, various features can be grouped together to streamline the disclosure. However, the claims cannot set forth every feature disclosed herein as embodiments can feature a subset of said features. Further, embodiments can include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

The invention claimed is:

1. A system for providing location-specific financial information to a user, comprising:
   a geographic data system comprising at least one processor and memory in communication with the at least one processor, the geographic data system being programmed to perform operations comprising:
   determining a first user expense category for a user, the determining of the first user expense category being based at least in part on communication data describing communications for the user;
   receiving, from an application executing at a user computing device, location data indicating a first geographic location, the location data being generated by a location sensor at the user computing device;
   determining a location-specific user expense based at least in part on the first user expense category and the location data;
   generating a graphical user interface comprising a map including a first geographic location and an indication of the location-specific user expense; and
   serving the graphical user interface to the application.

2. The system of claim 1, wherein the communication data comprises at least one of a social media data feed describing at least one social media post of the user or an e-mail feed describing at least one e-mail of the user.

3. The system of claim 1, the operations further comprising:
   comparing the communication data to a set of keywords; and
   selecting the first user expense category based at least in part on the comparing of the communication data to the set of keywords.

4. The system of claim 3, operations further comprising determining that at least one keyword of the set of keywords appears in the communication data more than a threshold number of times.

5. The system of claim 3, the operations further comprising determining that at least one keyword of the set of keywords appears in the communication data at a concentration greater than a concentration threshold.

6. The system of claim 1, the operations further comprising, before determining the location-specific user expense, determining that the first user expense category is relevant to the first geographic location.

7. The system of claim 1, the operations further comprising:
   receiving goal data describing a financial goal of the user, the goal data comprising cost data describing a cost of the financial goal and timing data describing a date for the financial goal;
   determining a likelihood that the user will meet the financial goal based at least in part on the location-specific user expense; and
   populating a financial goal field of the graphical user interface, wherein the financial goal field indicates the likelihood that the user will meet the financial goal.

8. The system of claim 7, the operations further comprising:
   determining that the first geographic location is within a threshold distance of a merchandise dealer;
   receiving dealer data describing a merchandise item sold by the merchandise dealer; and
   determining a merchandise expense for purchasing the merchandise item, wherein the likelihood that the user will meet the financial goal is also based at least in part on the merchandise expense.

9. The system of claim 1, the operations further comprising:
   receiving financial data describing a set of assets held by the user; and
   generating user base data for the user, wherein the user base data describes the set of assets held by the user and the first user expense category.

10. The system of claim 1, wherein the location data indicates the first geographic location of the user computing device, the operations further comprising:
    receiving, from the application, second location data indicating a second geographic location of the user computing device;
    determining that the second geographic location is different than the first geographic location;
    generating a second location-specific user expense based at least in part on the first user expense category and the second location data; and
    sending an alert message to the application, the alert message indicating the second location-specific user expense, the alert message comprising an instruction to awaken the application.

11. The system of claim 10, the operations further comprising:
    generating an updated graphical user interface comprising an indication of the second geographic location and an indication of the second location-specific user expense; and
    sending an alert message to the application, the alert message comprising an instruction to modify the graphical user interface at the user computing device.

12. The system of claim 1, the operations further comprising:
    before serving the graphical user interface to the application, generating a background user interface including the location data; and before serving the graphical user interface to the application, serving the background user interface to the application.

13. A computer-implemented method for providing location-specific financial information to a user, comprising:
   determining, by a geographic data system, a first user expense category for a user, the geographic data system comprising at least one processor and memory in communication with the at least one processor, the determining of the first user expense category being based at least in part on communication data describing communications for the user;
   receiving, by the geographic data system and from an application executing at a user computing device, location data indicating a first geographic location, the location data being generated by a location sensor at the user computing device;
   determining, by the geographic data system, a location-specific user expense based at least in part on the first user expense category and the location data;
   generating, by the geographic data system, a graphical user interface comprising a map including a first geographic location and an indication of the location-specific user expense; and
   serving the graphical user interface by the geographic data system to the application.

14. The computer-implemented method of claim 13, wherein the communication data comprises at least one of a social media data feed describing at least one social media post of the user or an e-mail feed describing at least one e-mail of the user.

15. The computer-implemented method of claim 13, further comprising:
   comparing, by the geographic data system, the communication data to a set of keywords; and
   selecting the first user expense category, by the geographic data system, based at least in part on the comparing of the communication data to the set of keywords.

16. The computer-implemented method of claim 15, operations further comprising determining, by the geographic data system, that at least one keyword of the set of keywords appears in the communication data more than a threshold number of times.

17. The computer-implemented method of claim 15, further comprising determining, by the geographic data system, that at least one keyword of the set of keywords appears in the communication data at a concentration greater than a concentration threshold.

18. A non-transitory machine-readable medium having instructions thereon that, when executed by at least one processor, cause the at least one processor to perform:
   determining a first user expense category for a user, the determining of the first user expense category being based at least in part on communication data describing communications for the user;
   receiving, from an application executing at a user computing device, location data indicating a first geographic location, the location data being generated by a location sensor at the user computing device;
   determining a location-specific user expense based at least in part on the first user expense category and the location data;
   generating a graphical user interface comprising a map including a first geographic location and an indication of the location-specific user expense; and
   serving the graphical user interface to the application.

* * * * *